United States Patent
Sato et al.

(10) Patent No.: US 6,530,175 B2
(45) Date of Patent: Mar. 11, 2003

(54) WINDOW LIFTING AND LOWERING APPARATUS

(75) Inventors: Masaaki Sato, Shizuoka (JP); Hiroshi Otaka, Shizuoka (JP)

(73) Assignee: Koito Manufacturing Co., Ltd., Tokyo (JP)

(*) Notice: Subject to any disclaimer, the term of this patent is extended or adjusted under 35 U.S.C. 154(b) by 0 days.

(21) Appl. No.: 10/061,267

(22) Filed: Feb. 4, 2002

(65) Prior Publication Data
US 2002/0104267 A1 Aug. 8, 2002

(30) Foreign Application Priority Data
Feb. 5, 2001 (JP) ........................................ 2001-027815

(51) Int. Cl.[7] .............................................. E05F 15/00
(52) U.S. Cl. ............................ 49/138; 49/350; 475/170
(58) Field of Search .......................... 49/348, 349, 350, 49/502, 138; 74/640, 457, 821; 475/162, 169, 170

(56) References Cited

U.S. PATENT DOCUMENTS

| | | | | |
|---|---|---|---|---|
| 2,370,872 A | * | 3/1945 | Miller et al. ................ | 475/170 |
| 2,864,267 A | * | 12/1958 | Merriman et al. .......... | 475/170 |
| 3,948,119 A | * | 4/1976 | Schlapp ....................... | 74/805 |
| 4,998,379 A | * | 3/1991 | Yamada et al. .............. | 49/138 |
| 5,085,004 A | * | 2/1992 | Beauprez ..................... | 49/138 |
| 5,564,231 A | | 10/1996 | Tajima et al. | |
| 6,094,868 A | | 8/2000 | Otaka et al. | |
| 6,114,820 A | * | 9/2000 | Nishigaya ................... | 318/466 |

* cited by examiner

*Primary Examiner*—Jerry Redman
(74) *Attorney, Agent, or Firm*—Sughrue Mion, PLLC

(57) ABSTRACT

A window lifting and lowering apparatus that includes an arm pivotally moved to lift and lower a window of a vehicle. A cycloidal speed reducing mechanism is used for transmitting a rotational force of a drive shaft to the arm at a reduced speed. The cycloidal speed reducing mechanism includes a ring gear disposed in a fixed state, a planetary gear eccentrically rotated in a state of being brought into mesh with the ring gear by the rotational force of the drive shaft, a rotating disk for transmitting rotation of the planetary gear to the arm, and a stopper gear fixed to the ring gear for restricting a pivotal movement position of the planetary gear. In accordance with the eccentric pivotal movement of the planetary gear, a stopper pin provided on the planetary gear is made to impinge with a stopper projection provided on the stopper gear.

5 Claims, 5 Drawing Sheets

WINDOW LIFTING AND LOWERING APPARATUS

BACKGROUND OF THE INVENTION

1. Field of the Invention

The present invention relates to a lifting and lowering apparatus for a window, such as for use in opening and closing a window of an automobile. More particularly, the present invention relates to a window lifting and lowering apparatus capable of restricting lifting and lowering positions of the window.

2. Description of the Related Art

As a window lifting and lowering apparatus of an automobile, there has been proposed a single arm type window lifting and lowering apparatus for lifting and lowering window glass by pivoting an arm connected to window glass in an up and down direction. A conventional single arm type window lifting and lowering apparatus is constructed by using a sector gear in the shape of a circular arc pivoted by being brought into mesh with a pinion pivoted by a motor or the like. By pivoting an arm connected to the sector gear along with the sector gear, window glass connected to a front end of the arm can be moved in an up and down direction along an opening portion of a window or the like of an automobile. According to such a window lifting and lowering apparatus, since the apparatus typically requires a long movement range for lifting and lowering the window glass, there poses a problem that a diameter dimension and a length of the sector gear are prolonged in accordance therewith, and accordingly, the single arm type window lifting and lowering apparatus becomes large in size.

In order to resolve such a problem, the applicant has previously developed a single arm type window lifting and lowering apparatus utilizing a planetary gear mechanism to thereby realize small-sized formation of the window lifting and lowering apparatus. According to the window lifting and lowering apparatus developed by the applicant, a planetary gear mechanism is used along with a ring gear. By driving to rotate the planetary gear brought into mesh with the ring gear by a motor or the like, the planetary gear is pivoted at a reduced speed, and by engaging an arm connected to window glass to the planetary gear, the arm is pivoted at the reduced speed and the window glass is made movable.

However, according to this related art window lifting and lowering apparatus developed by the applicant, the planetary gear is pivoted without being restricted in a rotational amount thereof in the ring gear and therefore, when the window lifting and lowering apparatus is applied to a window of an automobile, a movable range of window glass cannot be restricted. Therefore, for example, in a sedan or the like, an upper movement position of the window is typically restricted by use of a window sash by causing the window glass to impinge to the window sash. On a lower side thereof, where a window sash is not present, however, a lower movement position of the window glass cannot be restricted and the window glass is operated to lower more than necessary. Further, in an automobile in which a window sash is not present even on an upper side of the window glass, such as a hard top type automobile, both the upper movement position and the lower movement position of the window glass cannot be restricted. Therefore, to ensure that the window does not lower or rise to far, the movement range of window glass is restricted by arranging a restricting member impinging to the window glass at the lower movement position or the upper and lower movement positions on the side of the body of an automobile. However, there remains a problem preferably to be improved further, in which the body structure of the automobile becomes complicated thereby and a degree of freedom of layout design of various parts in the body of the automobile is restricted.

SUMMARY OF THE INVENTION

It is an object of the invention to provide a window lifting and lowering apparatus for restricting the raising and lowering positions of a window without the need for a restricting member on the body side of an automobile and accordingly, realizing simplification of a structure thereof.

According to an aspect of the invention, there is provided a window lifting and lowing apparatus comprising an arm pivoted to lift and lower the window, a drive shaft operable to transmit a rotational force, and a speed reducing mechanism operable to reduce and transmit the rotational force produced by rotation of the drive shaft to the arm. In one embodiment, the speed reducing mechanism comprises a ring gear disposed in a fixed state, a planetary gear operable to pivotally move the arm by being rotated eccentrically in a state of being brought into mesh with the ring gear by the rotational force of the drive gear, and a restricting member integrated with the ring gear and operable to restrict a pivotal movement position of the planetary gear by impinging to a portion of the planetary gear.

Further, the portion of the planetary gear may include a stopper pin positioned in a circumferential direction of the planetary gear, and the restricting member may include a stopper gear in the shape of a circular ring integrated with the ring gear by being brought in mesh with the ring gear at an arbitrary pivotal movement position. Further, a portion of the stopper gear in a circumferential direction may include a stopper member which impinges with the stopper pin in the circumferential direction.

According to the window lifting and lowering apparatus of the invention, when the drive shaft is driven to rotate, the planetary gear is eccentrically pivoted inside of the ring gear in a state of being brought into mesh with teeth of the ring gear. As such, rotational force in a revolving direction in accordance with the pivotal movement of the planetary gear is transmitted to the arm, and the arm is pivotally moved at a reduced speed which then causes the window glass to be lifted and lowered. Further, in accordance with eccentric pivotal movement of the planetary gear, when a stopper pin provided at a portion of the planetary gear impinges to the stopper member provided at the stopper gear, pivotal movement of the planetary gear is restricted and pivotal movement of the arm is restricted to thereby restrict the movement position of the window glass. Therefore, small-sized formation of the window lifting and lowering apparatus can be realized without complicating the speed reducing mechanism. As such, the window lifting and lowering apparatus can be mounted to a small-sized vehicle. Further, it is not necessary to provide a structure for restricting movement of window glass on a body side of the automobile, and accordingly, simplification of an automobile structure can be realized.

DETAILED DESCRIPTION OF THE PREFERRED EMBODIMENTS

Figure 1:
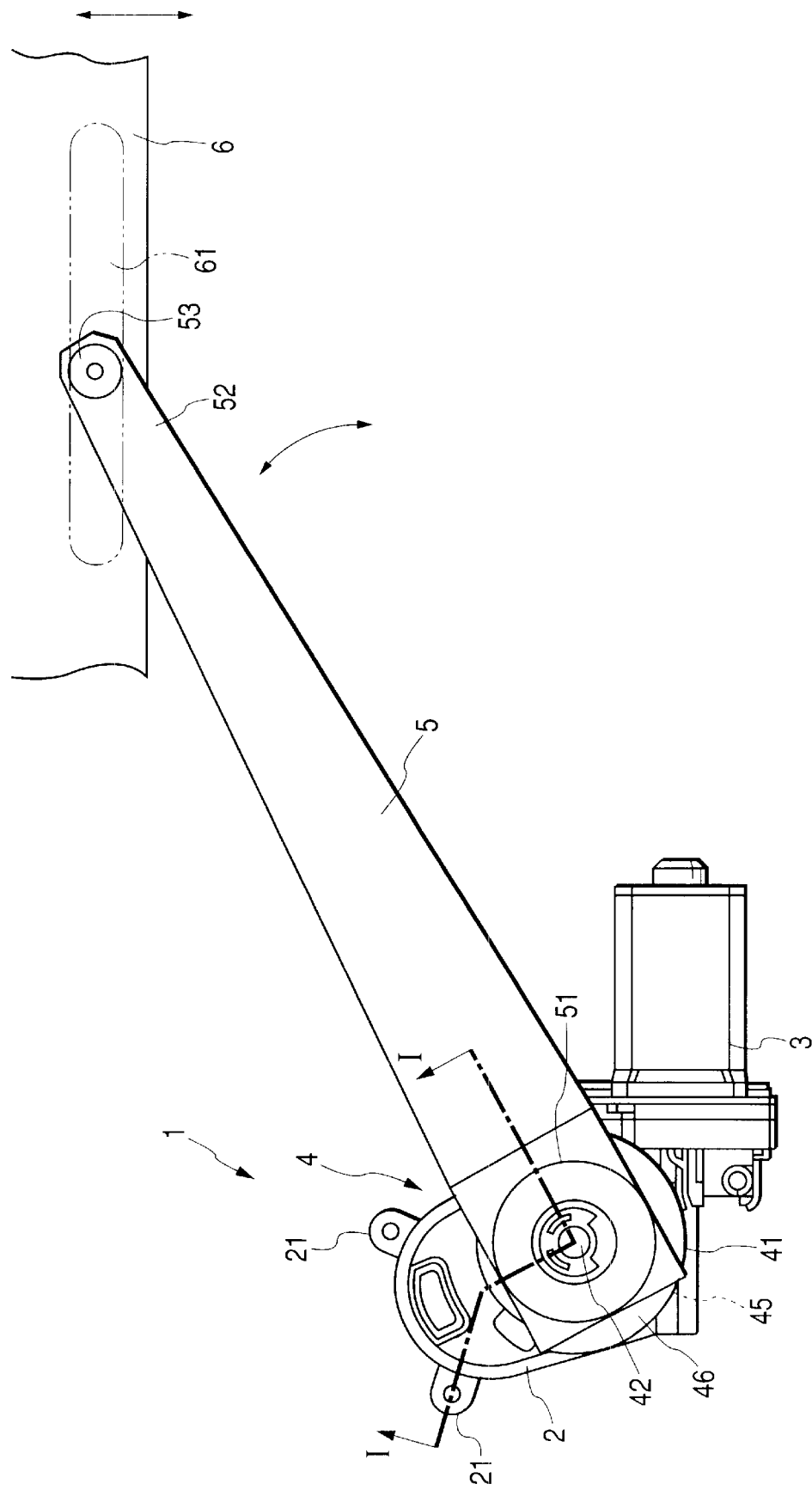
FIG. 1 is a front view of an embodiment of a window lifting and lowering apparatus according to the invention.

Next, an explanation will be given of embodiments of the invention in reference to the drawings. FIG. 1 is a front view of a window lifting and lowering apparatus according to the invention. The window lifting and lowering apparatus in this embodiment is a power window apparatus for lifting and lowering window glass using an electric motor. A base 2 of a window lifting and lowering apparatus 1 is fixed to a vehicle body of an automobile, not illustrated, and an electric motor 3 is attached to the base 2. The base 2 is provided with fixing leg portions 21 at a plurality of locations, and the base 2 is fixed to the body of the automobile by bolts or the like at the fixing leg portions 21. Further, the base 2 constitutes a portion of a cycloidal speed reduction mechanism 4, discussed in detail later, and an output side of the cycloidal speed reducing mechanism 4 is attached with a base end portion 51 of an arm 5. The arm 5 is constituted to pivot centering on the base end portion 51 and is constituted such that a front end portion 52 thereof is connected with a portion of window glass 6 movably along an opening portion of the body such as a window of the automobile, and the window glass 6 is lifted and lowered by pivoting the arm 5. As a structure of connecting therebetween, a circular roller 53 may be connected to the front end portion 52 of the arm 5 and engaged with a long hole rail 61 provided at the window glass 6. When the arm 5 is pivoted, by slidingly moving the circular roller 53 inside of the long hole rail 61, the window glass 6 is lifted and lowered by converting pivotal movement of the arm 5 into linear movement of the window glass 6. Further, the base 2 is provided with electrical circuitry and components for driving the electric motor 3 by techniques known in the art, an therefore, an explanation thereof will be omitted here.

Figure 2:
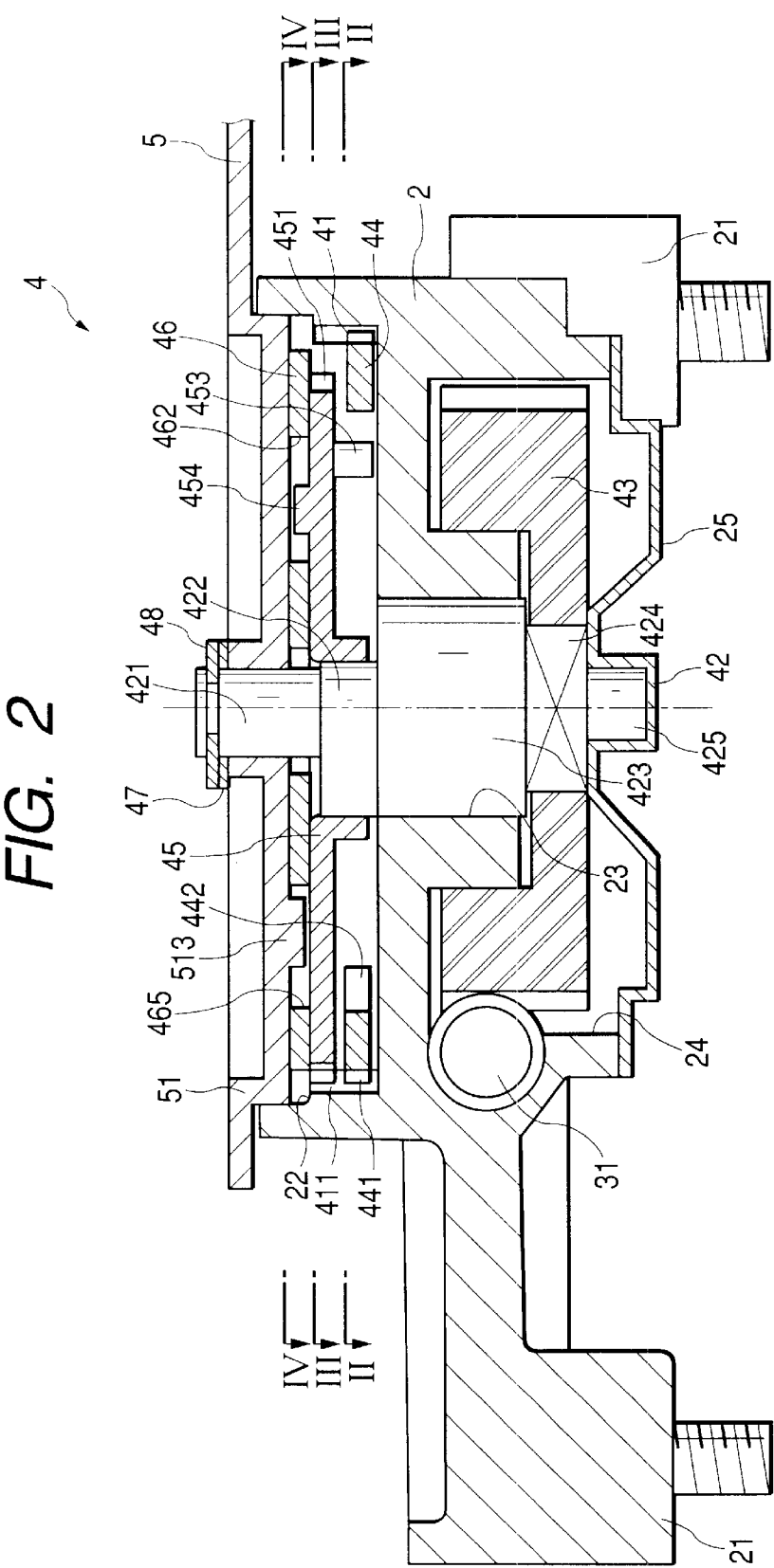
FIG. 2 is an enlarged sectional view taken along a line I—I of FIG. 1.
Figure 6:
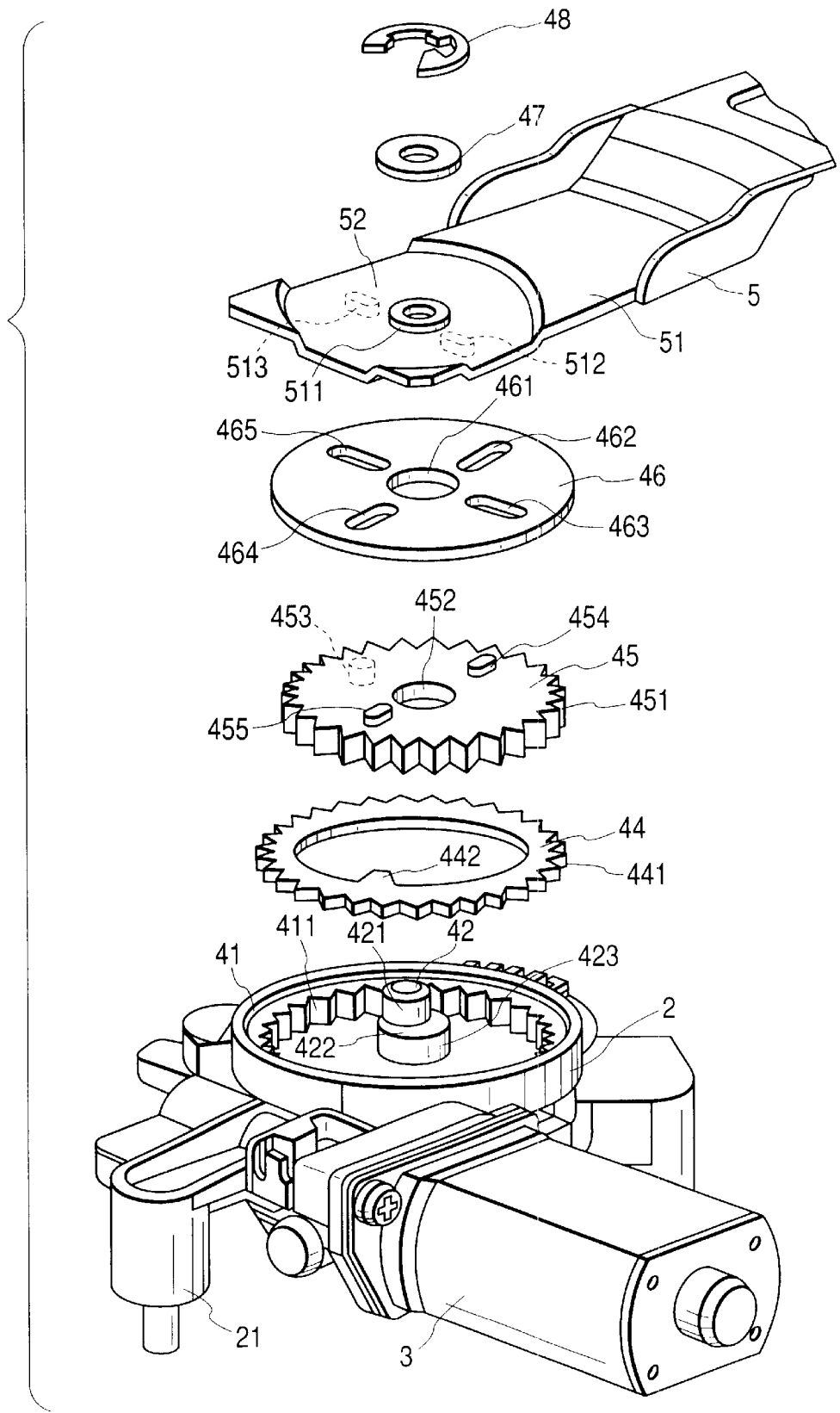
FIG. 6 is a partially disassembled perspective view of main portions of the window lifting and lowering apparatus according to an embodiment of the invention.

FIG. 2 is an enlarged sectional view taken along a line I—I of FIG. 1, FIG. 3 through FIG. 5 are views taken along a line II—II, a line III—III and a line IV—IV of FIG. 2. Further, FIG. 6 is a partially disassembled view of main portions of the invention. As shown in these views, on an upper face side of the base 2, there is formed an upper face recessed portion 22 constituting a shallow circular shape. A ring gear 41 is fixed in a state having inner teeth 411 formed along an inner peripheral face of the upper face recessed portion 22. A shaft hole 23 is opened at the base 2 at a central portion of the ring gear 41 and the shaft hole 23 is insertedly fitted with a drive shaft 42 provided with a small diameter circular boss portion 421, an eccentric circular boss portion 422, a large diameter circular boss portion 423, a rectangular boss portion 424, and a small diameter circular boss portion 425 in parallel with an axial direction from an upper end portion side thereof and axially supported rotatably at the large diameter boss portion 423. Further, there is formed a circular lower face recessed portion 24 on a lower face side of the base 2 and the rectangular boss portion 424 and the small diameter circular boss portion 425 of the drive shaft 42 are disposed to project from the shaft hole 23. In addition, a worm wheel 43 is inwardly mounted to the inside of the lower face recessed portion 24, and the worm wheel 43 is fitted to the rectangular boss portion 424 of the drive shaft 42 and is connected thereto to be integral in an axially pivoting direction. The worm wheel 43 is brought into mesh with a worm 31 attached to a rotational output shaft (not illustrated) of the electric motor 3 attached to the base 2. When the electric motor 3 is driven to rotate, a rotational force thereof is transmitted from the worm 31 to the worm wheel 43 and is further transmitted to the drive shaft 42 to thereby rotate the drive shaft 42. Further, on a lower side of the worm wheel 43, there is provided a lower cover 25 for sealing the lower face recessed portion 24 by being attached to the base 2.

Inside of the upper side recessed portion 22, the eccentric circular boss portion 422 of the drive shaft 42 is arranged at a position in an axial direction substantially the same as that of the ring gear 41. Also inside of the upper side recessed portion 22A is a planetary gear 45 which is pivoted at an inner side area of the ring gear 41 and is axially supported by the eccentric circular boss portion 422. The planetary gear 45 is constituted by a spur gear having a diameter slightly smaller than an inner diameter dimension of the ring gear 41 and is formed with outer teeth 451 to mesh with the inner teeth 411 of the ring gear 41 at an outer peripheral face thereof. Further, a circular shaft hole 452 having a comparatively large diameter dimension is opened at a central position of the planetary gear 45 wherein the eccentric circular boss portion 422 is inserted into the shaft hole 452 freely in the rotational direction. Further, two oval type pins 454 and 455 are erected to direct upwardly at an upper face of the planetary gear 45 on both sides thereof in a diameter direction interposing the shaft hole 452. Also, a lower face of the planetary gear 45 is integrally provided with a stopper pin 453 projected to direct downwardly at a portion of its circumference. According to the embodiment, the stopper pin 453 comprises a member in a shape of a circular cylinder formed separately from the planetary gear 45. The member is implanted at a portion of the circumference of the lower face of the planetary gear 45.

Further, a stopper gear 44 is inwardly mounted to a lower side of the planetary gear 45 inside of the upper side recessed portion 22. The stopper gear 44 is formed as a gear in the shape of a circular ring with outer teeth 441 having a shape the same as that of the inner teeth 411 of the ring gear 41. The stopper gear 44 is inwardly mounted thereto in a state in which the outer teeth 441 are brought into mesh with the inner teeth 411 of the ring gear 41. Further, a stopper projection 442 projected to an inner diameter direction is integrally formed with a portion of an inner peripheral edge of the stopper gear 44 in a circumferential direction. A dimension of projection in the diameter direction is set to be arranged on a movement locus of the stopper pin 453 provided at the portion of the circumference of the planetary gear 45 when the planetary gear 45 is pivoted.

Meanwhile, a pivoting (or rotating) disk 46 constituting a circular shape is arranged on an upper side of the planetary gear 45 to which the base end portion 51 of the arm 5 is arranged thereon. The base end portion 51 is provided with a circular portion 52 formed by bending to a lower face side thereof and the circular portion 52 is inserted into the upper side recessed portion 22. Further, the small diameter circular boss portion 421 at the upper end of the drive shaft 42 is inserted into a center hole 461 having a large diameter provided at a central position of the pivoting disk 46 and further inserted through a shaft hole 511 provided at the base end portion 51 of the arm 5. An E-ring 48 fitted to a washer 47 is insertedly fitted to the small diameter circular boss portion 421 to prevent detachment of the pivoting disk 46 and the arm 5.

The pivoting disk 46 can be moved by small amounts relative to the drive shaft 42 respectively in a rotational direction and a diameter direction thereof between axial directions of the planetary gear 45 and the arm 5 since a diameter dimension of the center hole 461 is formed to be larger than a diameter dimension of the small diameter circular boss portion 421. Further, at positions of the pivoting disk 46 which are equally divided in the circumferential direction, there are respectively formed four long grooves 462, 463, 464 and 465 respectively prolonged in the diameter direction. Among the four long grooves, two long grooves 462 and 464 are arranged on one diameter line, and are inserted with the two oval type pins 454 and 455 provided at the upper face of the planetary gear 45. Further, the other two long grooves 463 and 465, are inserted with two oval type pins 512 and 513 provided at a lower face of the base end portion 51 of the arm 5 on both sides thereof in the diameter direction interposing the shaft hole 51 and erected to direct downwardly. Here, a dimension in a longitudinal direction (diameter direction) of the respective long grooves 462 through 465 of the pivoting disk 46 is set to a length twice or more as much as an inner diameter direction of the center hole 461 of the planetary gear 45, and a width dimension of the respective long grooves 462 through 465 is substantially made equal to a dimension in the direction of a short width of the respective oval type pins 454, 455, 512 and 513 of the planetary gear 45 and the arm 5.

According to the window lifting and lowering apparatus having the above-described constitution, there is constituted the cycloidal speed reducing mechanism 4 mainly constituted by the drive shaft 42, the ring gear 41 and the planetary gear 45. Further, when the electric motor 3 is driven and the drive shaft 42 is pivoted via the worm 31 and the worm wheel 43, the planetary gear 45 fitted to the eccentric circular boss portion 422 is pivoted in a state of being eccentric to the drive shaft 42. That is, the planetary gear 45 is pivoted (revolved) around the drive shaft 42 while the outer teeth 451 are being brought in mesh with the inner teeth 411 of the ring gear 41 and at the same time, pivoted (rotated) around the drive shaft 42. Here, when a number of teeth of the outer teeth 451 of the planetary gear 45 is designated by notation ZA and a number of teeth of the inner teeth 411 of the ring gear 41 is designated by notation ZB, a rotational number N of the planetary gear 45 when the drive shaft 42 is rotated by one rotation is as follows.

$$N=(ZA-ZB)/ZA$$

Therefore, by pertinently setting the number of teeth ZA of the planetary gear 45 and the number of teeth ZB of the ring gear 41, a speed reduction ratio can be provided and the cycloidal speed reducing operation is realized. Further, when ZA<ZB, N, mentioned above, is a negative value, which signifies that the planetary gear 45 is rotated in a direction opposed to a direction of rotating the drive shaft 42.

When the planetary gear 45 is pivoted in a reduced speed state relative to the rotational number of the drive shaft 42 and in a state of being eccentric to the drive shaft in this way, the oval type pins 454 and 455 of the planetary gear 45 transmit rotational force in width directions of the long grooves 462 and 464 to the pivoting disk 46 while being slidingly moved in longitudinal directions of the long grooves 462 and 464. Further, by rotating the pivoting disk 46 exerted with the rotational force, the rotational force is transmitted to the arm 5 in width directions of the long grooves 463 and 465 since the oval type pins 512 and 513 of the arm 5 are exerted with force in the width directions from the long grooves 463 and 465 while being slidingly moved in the longitudinal directions in the long grooves 463 and 465. Therefore, by constituting a shaft coupling structure near to so-to-speak Oldham coupling by the planetary gear 45, the pivoting disk 46 and the arm 5, the rotational force of the planetary gear 45 is transmitted to the arm 5 and the arm 5 is pivoted centering on the drive shaft 42. Therefore, by regular and reverse rotation of the electric motor 3, the arm 5 is reciprocally pivoted, and the window glass 6 connected to the front end portion of the arm 5 is moved in the up and down direction along the window of the automobile to thereby open and close the window of the automobile.

In this way, the cycloidal speed reducing mechanism 4 is arranged on the rotational output side of the electric motor 3, pivotal speed of the drive shaft 42 driven to rotate by the electric motor 3 is reduced by the cycloidal speed reducing mechanism 4, the arm 5 is pivoted at a desired speed, and accordingly, the window glass can be lifted and lowered at the desired speed. Therefore, in comparison with the conventional single arm type window lifting and lowering apparatus, a sector gear occupying a large portion of a space is dispensed with and small-sized formation of the window lifting and lowering apparatus can be realized. Further, it is not necessary to ensure an allowance of moving the sector gear in pivoting the arm 5 and therefore, a space for installing the window lifting and lowering apparatus can be reduced. As such, the window lifting and lowering apparatus can be used in a small-sized automobile and the degree of freedom of design of the automobile is promoted. Further, the arm 5 is pivoted by canceling eccentric pivotal movement of the planetary gear 45 by the rotating disk 46 and therefore, the arm 5 can smoothly be pivoted at equal angular speed and the window glass 6 can be lifted and lowered smoothly.

Figure 3:
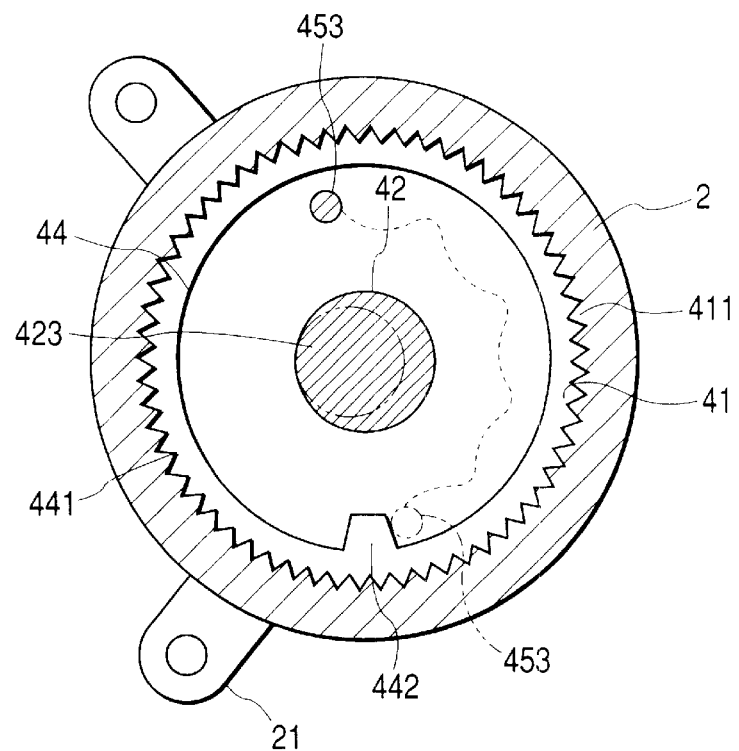
FIG. 3 is a view taken along a line II—II of FIG. 2.
Figure 4:
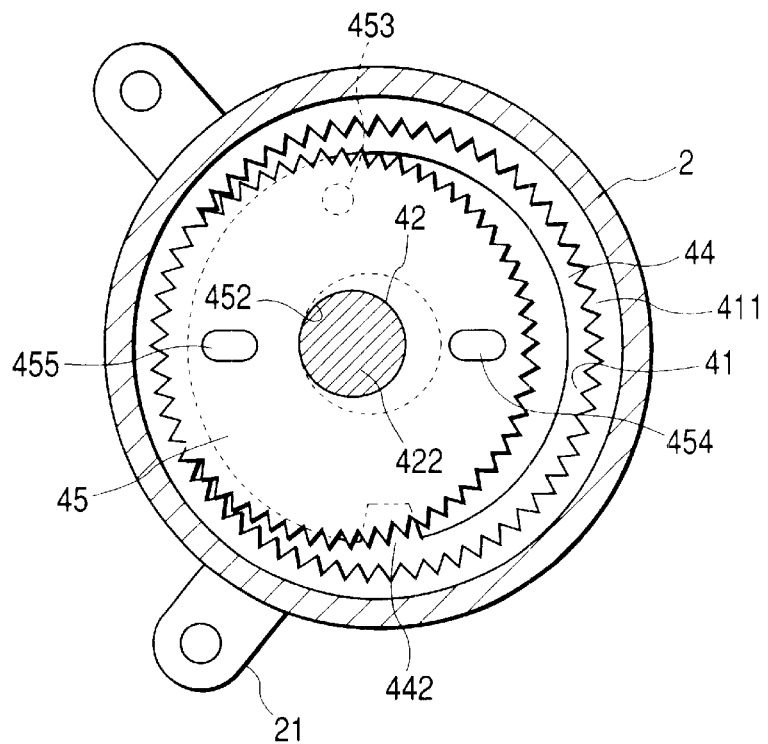
FIG. 4 is a view taken along a line III—III of FIG. 2.
Figure 5:
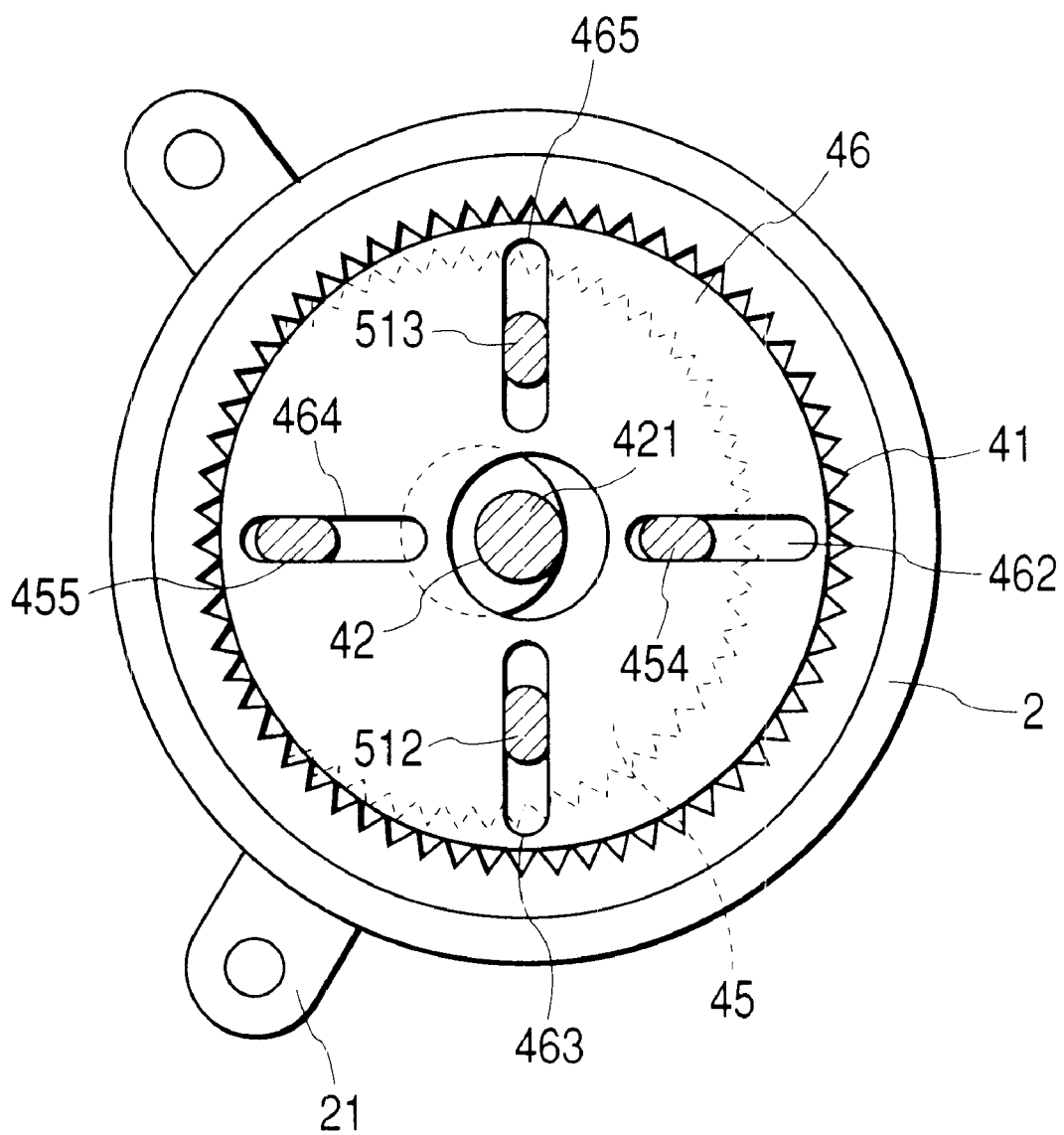
FIG. 5 is a view taken along a line IV—IV of FIG. 2.

In carrying out lifting and lowering operations of the window glass 6 by the arm 5, as described above, the planetary gear 45 is pivoted in the eccentric state inside of the ring gear 41 and at this occasion, the stopper pin 453 projected downwardly from the lower face of the planetary gear 45 takes a trochoidal locus relative to the ring gear 41 as shown by FIG. 3. Further, when the planetary gear 45 is pivoted in one direction and pivoted to a predetermined pivotal movement position, the stopper pin 453 is made to impinge to one side face of the stopper projection 442 of the stopper gear 44. The outer teeth 441 of the stopper gear 44 are brought into mesh with the inner teeth 411 of the ring gear 41 and therefore, the stopper gear 44 is integral with the ring gear 41 in the rotational direction, that is, integral with the base 2 and is not rotated. As such, by impinging contact between the stopper projection 442 and the stopper pin 443, pivotal movement of the planetary gear 45 thereafter is restricted and pivotal movement of the arm 5 is also restricted. Therefore, by setting a position of the stopper projection 442 of the stopper gear 44 to a position intended to restrict downward movement of the window glass 6, that is, to a position of restricting pivotal movement of the planetary gear 45, the pivotal movement position of the arm 5, or more specifically, the lower movement position of the window glass 6 can be restricted by the window lifting and lowering apparatus per se. Therefore, when the window lifting and lowering apparatus is applied to an automobile, the lower movement position of the window glass 6 can be restricted without providing the restricting member for restricting lower movement of the window glass 6 on the body side of the automobile, and the body structure of the automobile can be prevented from being complicated.

Further, according to the stopper gear 44, the outer teeth 441 of its own can be brought in mesh with the inner teeth 411 of the ring gear 41 at an arbitrary pivotal movement position and therefore, by changing the pivotal movement position, a position of the stopper projection 442 provided at the stopper gear 44 in the circumferential direction can be changed. In this way, by changing the position of the stopper projection 442 in the circumferential direction, the pivotal movement position when the stopper pin 453 of the planetary gear 45 impinges to the stopper projection 442 can be changed and the pivotal movement position of the arm 5 in pivoting the planetary gear 45 in one direction, that is, the restricting position on the lower movement side of the window glass 6 can be changed. Therefore, even when window dimensions differ by a difference in the kind of the automobile, the difference can be dealt with by only adjusting the pivotal movement position in mounting the stopper gear 44 inwardly and in any case of the window dimensions, a proper lower movement position of the window glass can be set.

When the stopper projection 442 provided to the stopper gear 44 is provided at two different locations in the circumferential direction, one stopper projection is made to impinge to the stopper pin 453 when the planetary gear 45 is pivoted in one direction and the other stopper projection is made to impinge to the stopper pin 453 when the planetary gear 45 is pivoted in an opposed direction. As such, respective pivotal movement positions can be restricted in two pivotal movement directions of the planetary gear 45. Such a constitution using a stopper projection 442 at two locations becomes effective when it is necessary to respectively restrict the upper movement position and the lower movement position of the window glass as in an automobile of, for example, a hard top type. Further, when a movement dimension of the window glass differs by the kind of the automobile, a plurality of stopper gears formed with stopper projections at respectively different positions may be prepared and the stopper gear may be selected and mounted in accordance with the kind of the automobile to be mounted.

Further, although according to the above-described embodiment, the invention is applied to the power window apparatus for lifting and lowering the window glass by the electric motor, the invention is similarly applicable to a window lifting and lowering apparatus of a manual type for driving to rotate a drive shaft by a handle pivoted by manual operation. In addition, although according to the above-described embodiment, there is shown an embodiment of transmitting the rotational output of the electric motor to the drive shaft via the worm mechanism, the embodiment can also be constituted to transmit the rotational output of the electric motor to the drive shaft by other mechanisms.

As has been explained above, according to the window lifting and lowering apparatus of the invention, a stopper gear is used for restricting the pivotal movement of the planetary gear by impinging to a portion of the planetary gear. Accordingly, pivotal movement of the arm is restricted which restricts the position of the window glass. Therefore, small-sized formation of the window lifting and lowering apparatus is realized without forming the speed reducing mechanism in a large size, and as such, the window lifting and lowering apparatus can be mounted to a small-sized vehicle. Further, it is not necessary to provide a structure of restricting movement of the window glass on the body side of the automobile and simplification of the automobile structure and promotion of the degree of freedom of setting layout on the body side of the automobile can be realized.

What is claimed is:

1. A window lifting and lowering apparatus comprising:
    an arm pivoted to lift and lower a window;
    a drive shaft operable to transmit a rotational force; and
    a speed reducing mechanism operable to reduce and transmit the rotational force produced by rotation of the drive shaft to pivotally move the arm, the speed reducing mechanism comprising:
        a ring gear disposed in a fixed state;
        a planetary gear operable to pivotally move the arm by being rotated eccentrically in a state of being brought into mesh with the ring gear by the rotational force of the drive shaft; and
        a restricting member integrated with the ring gear and operable to restrict a pivotal movement position of the planetary gear by impinging to a portion of the planetary gear.

2. The window lifting and lowering apparatus according to claim 1, wherein the portion of the planetary gear includes a stopper pin positioned in a circumferential direction of the planetary gear.

3. The window lifting and lowering apparatus according to claim 1, wherein the restricting member includes a stopper gear in a shape of a circular ring integrated with the ring gear by being brought into mesh with the ring gear at an arbitrary pivotal movement position, and a portion of the stopper gear in a circumferential direction includes a stopper member which impinges with the portion of the planetary gear.

4. The window lifting and lowering apparatus according to claim 2, wherein the restricting member includes a stopper gear in a shape of a circular ring integrated with the ring gear by being brought into mesh with the ring gear at an arbitrary pivotal movement position, and a portion of the stopper gear in a circumferential direction includes a stopper member which impinges with the stopper pin in a circumferential direction.

5. The window lifting and lowering apparatus according to claim 1, further comprising a rotating disk in contact with the planetary gear and operable to transmit a rotation force of the planetary gear to pivotally move the arm.

* * * * *